(12) United States Patent
Schukat et al.

(10) Patent No.: US 8,730,944 B2
(45) Date of Patent: May 20, 2014

(54) METHOD AND ENTITIES FOR PROVIDING CALL ENRICHMENT OF VOICE CALLS AND SEMANTIC COMBINATION OF SEVERAL SERVICE SESSIONS TO A VIRTUAL COMBINED SERVICE SESSION

(75) Inventors: Alexander Schukat, Obfelden (CH); Kevin Linke, Dresden (DE); Sven Reinhardt, Dresden (DE)

(73) Assignee: Deutsche Telekom AG, Bonn (DE)

( * ) Notice: Subject to any disclaimer, the term of this patent is extended or adjusted under 35 U.S.C. 154(b) by 1234 days.

(21) Appl. No.: 11/749,353

(22) Filed: May 16, 2007

(65) Prior Publication Data

US 2007/0268891 A1 Nov. 22, 2007

(30) Foreign Application Priority Data

May 17, 2006 (EP) .................................. 06010171

(51) Int. Cl.
*H04L 29/06* (2006.01)
*H04L 12/64* (2006.01)

(52) U.S. Cl.
USPC ............ 370/352; 709/227; 709/228; 709/229

(58) Field of Classification Search
USPC ............................................... 370/395.2, 352
See application file for complete search history.

(56) References Cited

U.S. PATENT DOCUMENTS

| | | | | |
|---|---|---|---|---|
| 6,421,324 B1* | 7/2002 | Boyle et al. | .................... | 370/261 |
| 6,996,087 B2* | 2/2006 | Ejzak | ............................. | 370/338 |
| 7,107,464 B2* | 9/2006 | Shapira et al. | ................... | 726/15 |
| 7,386,855 B2* | 6/2008 | Song et al. | ..................... | 719/310 |
| 2002/0174220 A1* | 11/2002 | Johnson | ........................ | 709/224 |
| 2004/0003046 A1* | 1/2004 | Grabelsky et al. | ............ | 709/206 |
| 2004/0190489 A1 | 9/2004 | Palaez et al. | | |
| 2004/0260815 A1* | 12/2004 | Mampaey et al. | ............ | 709/227 |
| 2005/0058125 A1* | 3/2005 | Mutikainen et al. | ......... | 370/354 |
| 2006/0153353 A1* | 7/2006 | O'Neil | ..................... | 379/211.02 |
| 2006/0165060 A1* | 7/2006 | Dua | .............................. | 370/352 |
| 2006/0171541 A1* | 8/2006 | Horn et al. | ..................... | 380/278 |
| 2006/0187942 A1* | 8/2006 | Mizutani et al. | .............. | 370/401 |

(Continued)

FOREIGN PATENT DOCUMENTS

| | | |
|---|---|---|
| EP | 1377005 | 1/2004 |
| EP | 1487167 | 12/2004 |

(Continued)

OTHER PUBLICATIONS

3GPP TR 24.879: Combining CS Calls and IMS Sessions, Release 7. Published: Mar. 2006. Available: http://162.105.76.250/www.3gpp.org/Specs/latest/Rel-7/24_series/24879-700.zip.*

(Continued)

*Primary Examiner* — Ayaz Sheikh
*Assistant Examiner* — Tarell Hampton
(74) *Attorney, Agent, or Firm* — Leydig, Voit & Mayer, Ltd.

(57) ABSTRACT

A method for controlling communication between a number of first terminal modules connected to a multimedia IP network in particular with the first communication session being a call session already running, includes the steps of establishing a first communication session between the first terminal modules, establishing at least one second communication session between at least a subset of the first terminal modules, and storing relation information relating the first and the second communication sessions.

12 Claims, 5 Drawing Sheets

(56) References Cited

U.S. PATENT DOCUMENTS

| | | | |
|---|---|---|---|
| 2006/0229094 A1* | 10/2006 | Huh et al. | 455/518 |
| 2006/0270404 A1* | 11/2006 | Tuohino et al. | 455/432.3 |
| 2006/0276213 A1* | 12/2006 | Gottschalk et al. | 455/518 |
| 2007/0094691 A1* | 4/2007 | Gazdzinski | 725/62 |
| 2007/0180029 A1* | 8/2007 | Croak et al. | 709/204 |
| 2008/0046524 A1* | 2/2008 | Jerding et al. | 709/206 |
| 2008/0056242 A1* | 3/2008 | Hersent | 370/352 |
| 2008/0159262 A1* | 7/2008 | Crable et al. | 370/352 |
| 2008/0215736 A1* | 9/2008 | Astrom et al. | 709/226 |

FOREIGN PATENT DOCUMENTS

| | | |
|---|---|---|
| EP | 1517506 | 3/2005 |
| WO | WO-0169418 | 9/2001 |
| WO | WO-03054717 | 7/2003 |
| WO | WO-2004051531 | 6/2004 |

OTHER PUBLICATIONS

ETSI TS 123 228 V6.10.0; "Digital cellular telecommunications system (Phase 2+); Universal Mobile Telecommunications System (UMTS); IP Multimedia Subsystem (IMS); Stage 2"; Mar. 2005; pp. 1-181.

ETSI TS 123 218 V6.3.0; "3rd Generation Patnership Project; Technical Specification Group Core Network; IP Multimedia (IM) session Handling; IM call model; Stage 2 (Release 6)"; Mar. 2005; pp. 1-58.

European Search Report, EP 06 01 0171, European Patent Office, dated Oct. 30, 2006.

* cited by examiner

METHOD AND ENTITIES FOR PROVIDING CALL ENRICHMENT OF VOICE CALLS AND SEMANTIC COMBINATION OF SEVERAL SERVICE SESSIONS TO A VIRTUAL COMBINED SERVICE SESSION

Priority is claimed to European Patent Application No. EP06010171, filed on May 17, 2006, the entire disclosure of which is incorporated by reference herein.

The present invention in general relates to a method, a call control application server and a multimedia IP network system for controlling communication between a number of terminal modules connected to the multimedia IP network, and especially to enrichment of voice calls.

BACKGROUND

The development of Voice over IP (VoIP) technologies, accompanied by the fusion of voice and data networks into the next generation converged networks, offers opportunities of developing new converged voice and application services. Exemplary concepts which are currently being developed are Rich Calls integrating different content types, Push-to-Video enabling one-to-one or one-to-many transmission of video data with the push of one key or Online Conferencing based on VoIP.

Concurrent access to several types of services in known value added services like those mentioned above typically is provided with one and the same terminal device. Accordingly the use of standard telephones typically is insufficient and instead terminal devices with special capabilities like computing power or sophisticated graphical user interfaces are needed.

Especially for the combination of application and telephony services today so called collaboration or conferencing applications are utilized. For instance WO 2004/051531 A2 describes a method for collaboration integration is known, wherein a session initiator selects the required services prior to session establishment and sends a collaboration request. In response to receiving the collaboration request a corresponding collaboration service is selected from multiple available collaboration services offered by multiple service providers. In EP 1 377 005 A1 a telecommunication system for collaboration using Instant Messaging (IM) in multimedia telephony-over-LAN conferences is described. On establishment of a VoIP session the clients involved are checked for the capability of IM and if capable, also the IM service is started at the clients. The system described in EP 1 377 005 A1 however allows no user interaction or service selection.

Applications for implementing value added services typically require an application session to be started and to be explicitly configured for telephony. The application will then call all participants or the participants have to dial in to a special conferencing phone number. The system described in EP 1 517 506 A2 comprises, for instance, a server which contains a module for instructing two or more multimedia endpoints to call a dial number for establishing a multimedia conference. The method and system for improving the establishment of a multimedia session described in EP 1 517 506 A2 further requires the services to be selected by the session initiator prior to session establishment.

In EP 1 487 167 A1 a method is described for providing additional services to a called user terminal, wherein the called participant can select additional services at call signaling time. For this purpose a call session control network element and a primary application server are provided which are adapted to select and invoke according application servers at call signaling time.

The establishment of additional service sessions during a running session is however not possible in any of the prior art systems described above.

SUMMARY

The present invention provides a method for controlling communication between a number of first terminal modules connected to a multimedia IP network. The method includes the steps of: establishing a first communication session between the first terminal modules; establishing a second communication session between at least a subset of the first terminal modules; and storing relation information relating the first and the second communication sessions.

BRIEF DESCRIPTION OF THE DRAWINGS

It is shown in

DETAILED DESCRIPTION

Figure 1:
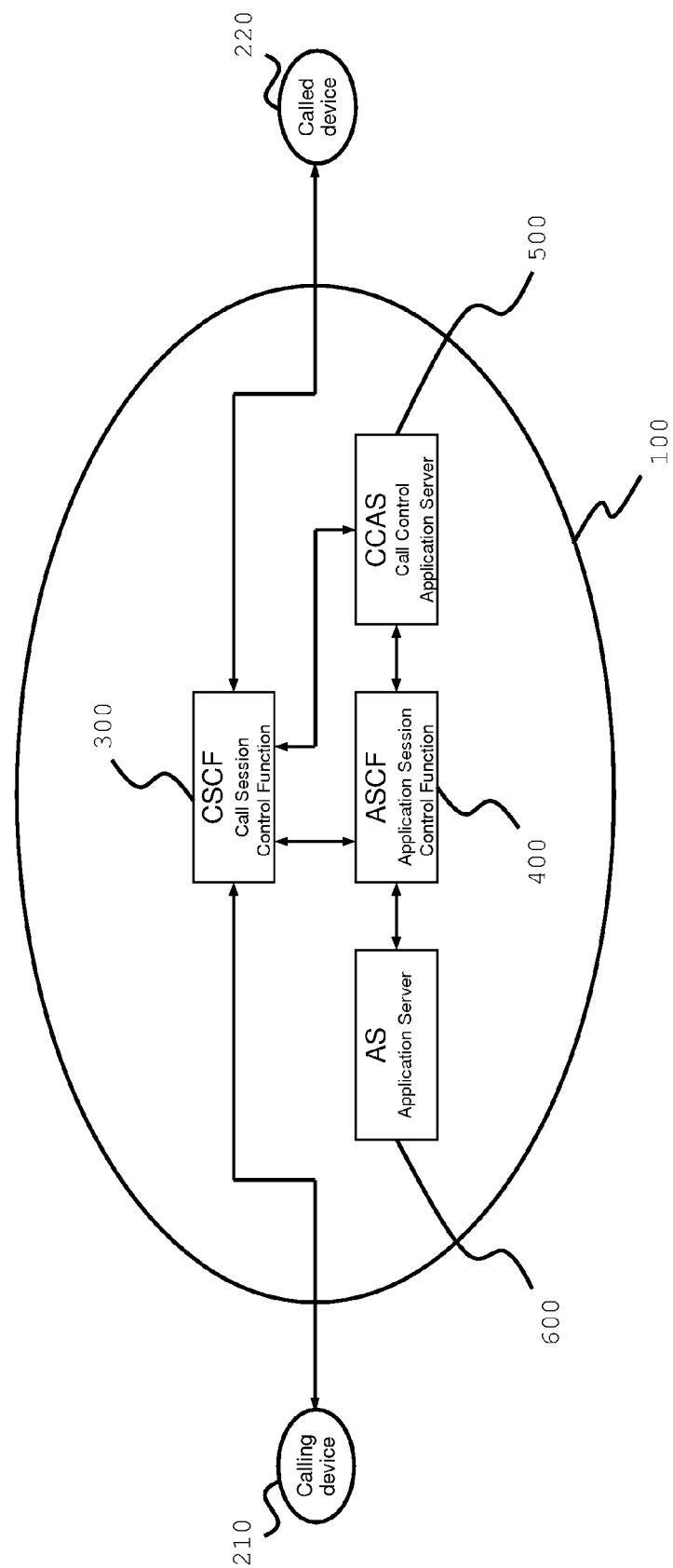
FIG. 1 an embodiment of an inventive multimedia IP network system to which two phone devices are connected.

The present invention provides a method, a network system and a call control application server which are capable of controlling communication between terminal modules connected to a multimedia IP network in a way that a running communication session can be enriched with additional services. In particular the present invention provides seamless enrichment of a voice call with an additional communication or collaboration or application service. Additionally, the invention integrates value added services into familiar communication processes. The invention comprises a method for controlling communication between a number of first terminal modules connected to a multimedia IP network with the steps of establishing a first communication session between the first terminal modules, establishing at least one second communication session between at least a subset of the first terminal modules, and storing relation information relating the first and the second communication sessions. Providing a semantic relation between the first and second communication sessions is one aspect of the invention. The semantic relation for instance enables the automatic termination of a service session when related sessions are terminated, as well as enhanced control and presentation functions of service sessions like handover of all related sessions, when only one session is handed over from one terminal module or user device to another.

Accordingly the inventive method also comprises the step of terminating at least one of the first and second communication sessions, wherein at least one other of the first and second communication sessions is automatically terminated depending on the stored relation information. Since providing seamless enrichment of a running communication session is a further object of the invention the step of establishing the second communication session can be performed while the first communication session already exists.

The enrichment of a running session with an additional communication or collaboration or application service may be initiated by either participant resulting in all participants of the running session, or a pre-selected subset thereof, to be connected automatically to the additional service session.

Accordingly in one embodiment of the inventive method the steps of establishing the second communication session and of storing the relation information are initiated by means of a request signal transmitted into the multimedia IP network by one of the first terminal modules. In another embodiment of the inventive method the steps of establishing the second communication session and of storing the relation information are initiated by means of a request signal transmitted into the multimedia IP network by a separate terminal module which is not part of the first communication session. This separate terminal module can for instance be provided as an intelligent client capable of displaying the call state of a call held on another black phone or soft phone device. Depending on the intended purpose the second terminal module can for instance be located at or near one of the first modules or at a separate location, for instance at a communication control center.

In a further aspect of the invention first and second communication sessions, in particular a voice call and another supporting service, are initiated simultaneously.

In one embodiment of this aspect of the invention a call request to a predefined address, for instance a special dial number, is transmitted for simultaneously initiating the steps of establishing the first and second communication sessions and of storing the relation information. In another embodiment of this aspect of the invention a request signal is transmitted into the multimedia IP network, for example from an intelligent software or hardware client, wherein the request signal comprises information on the type of the first and second communication sessions to be initiated.

Although a method as described above, wherein the first communication session is no voice connection, also lies within the scope of the invention, the invention is also directed towards enrichment of voice connections. Accordingly the first communication session may be a call session enabling a voice connection between the first terminal modules. Depending on the number of first terminal modules connected by means of the first communication session, the call session can also be a conference call session enabling a simultaneous voice connection between at least three terminal modules.

When the first communication session is a call session enabling a voice connection, the minimal functionality needed with respect to the first terminal modules for performing the inventive method comprises the ability to transmit and receive voice information and to transmit however natured signaling information during a running call. Advantageously, these abilities are met by nearly every telephone on the market. The specification of additional devices is determined by the additional service invoked. The kind of this service is free of choice, only limited by the availability of according application servers in the network and the functionality of the terminal devices utilized.

Each of the first terminal modules therefore can be provided as a single device or can comprise a number of devices, wherein each of the number of devices is adapted to participate in at least one of the first and second communication sessions. Furthermore, the first terminal modules can be provided as hardware or software modules or a combination thereof.

The step of establishing the second communication session between the first terminal modules with advantage comprises the step of analyzing a request signal to determine the type of the requested second communication session.

Depending on the type of communication session requested, an application server adapted to control such type of communication session is automatically selected and an invocation request is transmitted to the selected application server.

For semantically relating the first and second communication sessions according to the inventive method session information of the first communication session may be stored and means are provided for accessing this session information. Since the first communication session most preferably is a call session, the object of the invention is also achieved by a call control application server for use in a multimedia IP network, which comprises call session storage means for storing information related to a call session between at least two terminal modules connected to the multimedia IP network, an inquiry interface for receiving inquiries requesting information stored in said call session storage means, and inquiry analysis means for processing a received inquiry and accessing said call session storage means for providing the requested information.

One advantage of providing a semantic relation between the first and second communication sessions is the ability to automatically terminate a communication session when related sessions are terminated. The invention therefore further may include storage means for storing relation information which semantically relates the first and second communication sessions, wherein the relation information is stored at least until session termination.

An inventive multimedia IP network system adapted to perform the method described above accordingly comprises a first application server adapted to control a first communication session between a number of terminal modules connected to the network system, at least one second application server adapted to control a second communication session between at least a subset of the terminal modules, session storage means for storing information on the first and second communication sessions and relation storage means for storing information relating the first and the second communication sessions, wherein the first application server is in particular provided as a call control application server as described above.

Most preferably the network system is adapted to terminate at least one of the first and second communication sessions in response to termination of a related communication session.

In the following an embodiment of the invention is described, providing extension of a running voice call with for instance a data or video conference. Advantageously the steps of the participants for establishing and joining an additional service session which are necessary in the prior art can be omitted when utilizing the invention. Furthermore the invention provides for the capability of semantically relating service sessions of application systems of several different vendors. The invention also enables the integration of value added converged services with familiar communication processes, as for instance a phone call.

An embodiment of an inventive multimedia IP network system shown in FIG. 1 involves two participants, the calling participant and the called participant. However, the invention can also be implemented with an arbitrary number of participants. Furthermore, the participants do not have to be human beings, but can also be represented by intelligent devices or software programs or alike.

In the shown embodiment each participant is provided with a phone device, directly or indirectly connected to the multimedia IP network 100. No special features are required for this phone device, except for the ability to transmit and receive voice, as well as transmit however natured signaling information directly or indirectly into the multimedia IP network 100 during a running call.

In FIG. 1 accordingly two phone devices are shown, the calling device 210 and the called device 220. Both participants might require additional terminal devices for accessing the additional service to be added to the phone call session. The specification of these devices depends on the requirement of the additional service.

FIG. 1 further shows exemplary entities within the multimedia IP network 100 relevant for performing the inventive method.

The call session control function (CSCF) 300 is responsible for call routing and for invocation of specific application servers depending on a call or signaling request.

The call control application server (CCAS) 500 is responsible for implementing the call service, providing call control services, and maintaining call state information.

The application server (AS) 600 implements additional services beyond voice call. Also several application servers 600 can be provided for different services.

The basic functionality of the CSCF 300, the CCAS 500 and the AS 600 may be is in agreement with the according entities described in the standards ETSI TS 123 228 V6.10.0 ("Digital cellular telecommunications system (Phase 2+); Universal Mobile Telecommunications System (UMTS); IP Multimedia Subsystem (IMS); Stage 2") and ETSI TS 123 218 V6.3.0 ("3$^{rd}$ Generation Partnership Project; Technical Specification Group Core Network; IP Multimedia (IM) session handling; IM call model; Stage 2 (Release 6)").

The application session control function (ASCF) 400 is responsible for analyzing service session establishment and termination requests, collecting necessary call state information from the call control application server (CCAS) 500 and invoking an application server (AS) 600 or the CCAS 500 to start a requested service. Furthermore it maintains relations between service sessions to enable a semantic combination of several service sessions to one virtual service session. This enables, for instance, the automatic termination of all related service sessions when one of the specific sessions is terminated, as well as additional control functions.

The network elements shown in FIG. 1 can be provided as software or hardware modules or a combination thereof. Furthermore, the ASCF can be implemented as part of the CSCF, if appropriate.

The ASCF is one aspect of the invention and is not described in the standards ETSI TS 123 228 V6.10.0 and ETSI TS 123 218 V6.3.0 mentioned above.

The inventive method in this embodiment comprises the two steps of establishing a voice call and consecutively establishing an additional application session.

Figure 2:
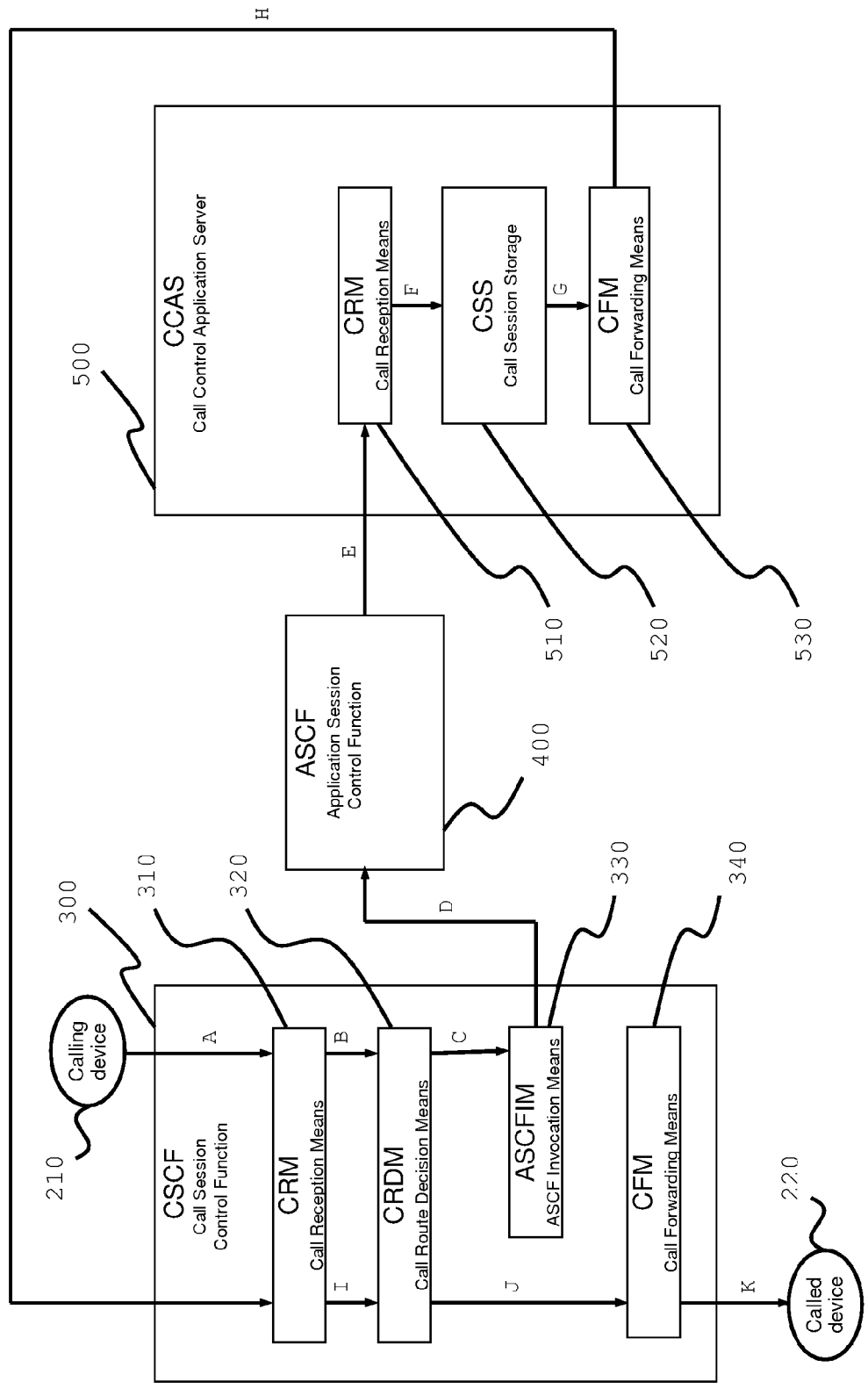
FIG. 2 a functional sequence for establishment of a voice call.

FIG. 2 shows a functional sequence of the establishment of a voice call, based on the functional components of the network elements, comprising the following steps.

A) The calling device 210 initiates a call to the called device 220. The call is forwarded to the call session control function (CSCF) 300 which comprises a call reception means (CRM) 310 to receive calls.

B) The CRM 310 forwards the call to the call route decision means (CRDM) 320 of the CSCF 300.

C) The CRDM 320 recognizes that the call is a voice call and routes it to the ASCF invocation means (ASCFIM) 330.

D) The call is forwarded to the ASCF 400 for processing of service session relations as described in more detail later on with respect to FIG. 4.

E) The call is forwarded by the ASCF 400 to the call reception means (CRM) 510 of the CCAS 500.

F) The CRM 510 forwards the call to the call session storage (CSS) 520 of the CCAS 500, where all information related to the current call, like participants involved and call state, is stored until the call is terminated or canceled.

G) The call is then forwarded to the call forwarding means (CFM) 530 of the CCAS 500.

H) The CFM 530 of the CCAS 500 forwards the call back to the CSCF 300.

I) The CRM 310 of the CSCF 300 forwards the call to the CRDM 320 of the CSCF 300.

J) The CRDM 320 recognizes that the call was already processed and forwards it to the call forwarding means (CFM) 340 of the CSCF 300.

K) The CFM 340 of the CSCF 300 forwards the call to the called device 220, thereby establishing the voice call.

Figure 3:
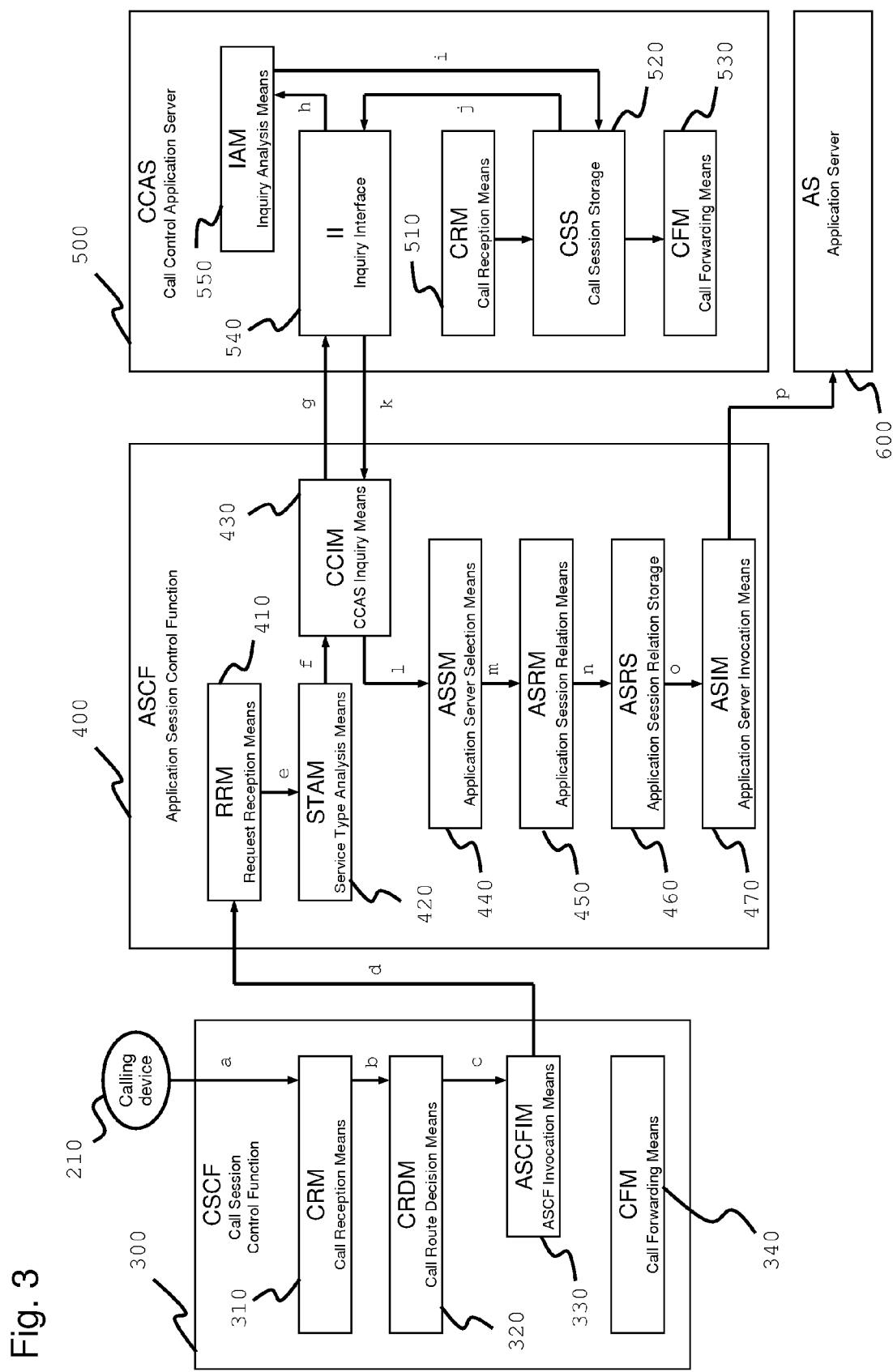
FIG. 3 a functional sequence for establishment of an additional application session.

In FIG. 3 further means of the ASCF 400 and the CCAS 500 are shown which are relevant for the present invention, in particular for establishing an additional application session during a running voice call and for semantically relating call and application sessions. The functionality of these means is described in the following.

The request reception means (RRM) 410 enables the ASCF 400 for receiving service requests. The service type analysis means (STAM) 420 enables the ASCF 400 for determining the type of service requested. This information is used to select an appropriate application server 600 to fulfill the request. Additionally, the STAM 420 can be capable of obtaining a service description of the requested service. The CCAS inquiry means (CCIM) 430 is provided for requesting call session information from the CCAS 500. The application server selection means (ASSM) 440 enables the ASCF 400 to select the appropriate application server 600 to fulfill the service request.

The application session relation means (ASRM) 450 enables the ASCF 400 to determine whether the requested service session shall be related to other service sessions and to create the relation records. In case of a service termination request it deletes the relations of the requested session. To be able of relation creation the ASRM 450 creates a session token for each requested session. Depending on the types of services and/or additional information, the ASRM 450 can decide whether to terminate all service sessions, when one of the service sessions contained in the session relation record terminates. Additional functions can be realized easily utilizing relation records, like providing service session relation information and control to participants.

The application session relation storage (ASRS) 460 saves all session relations for the time of their duration. The application server invocation means (ASIM) 470 enables the ASCF 400 of invoking selected application servers 600.

The inquiry interface (II) 540 of the CCAS 500 provides access to call session information stored in the call session storage (CSS) 520 of the CCAS 500. The inquiry analysis means (IAM) 550 enables the CCAS 500 of selecting the requested information.

FIG. 3 also shows a functional sequence of the establishment of an additional application session, comprising the following steps.

a) The calling device 210 initiates a request signal for an additional application service session. This request signal could for instance be created by dialing a special phone number or by sending a specific key sequence or message to the multimedia IP network 100.

b) The request is forwarded from the CRM 310 of the CSCF 300 to the CRDM 320.
c) The CRDM 320 recognizes that this is an application service request and forwards it to the ASCFIM 330.
d) The ASCFIM 330 of the CSCF 300 forwards the request to the RRM 410 of the ASCF 400.
e) The RRM 410 of the ASCF 400 forwards the request to the STAM 420.
f) The STAM 420 determines the type of service and invokes the CCIM 430.
g) The CCIM 430 uses the II 540 of the CCAS 500 to query for call session information for the participant that sent the service request, i.e. for the calling device 210.
h) The II 540 forwards the query to the IAM 550.
i) The IAM 550 queries the CSS 520 to provide call session information for the requested participant.
j) The CSS 520 forwards the requested information to the II 540.
k) The II 540 returns the requested information to the CCIM 430 of the ASCF 400.
l) The CCIM 430 forwards the call session information and the application service request to the ASSM 440.
m) The ASSM 440 determines the correct application server 600 to provide the requested application service. Due to this selection it determines the type of the service and creates a service session token. All information is then forwarded to the ASRM 450.
n) The ASRM 450 recognizes from the application service request that it shall be semantically related to the call session information provided. This decision is made due to the fact that the application service request originated from the same phone device 210 which the phone call described in the call session information is running on. The ASRM 450 creates a session relation record comprising session tokens of the call session and the application service session and forwards it to the ASRS 460 for storage for the time of the duration of the session relations.
o) The ASRS 460 forwards the application service request to the ASIM 470.
p) The ASIM 470 invokes the application server 600 selected by the ASSM 440, providing the participant list derived from the call session information.

Figure 4:
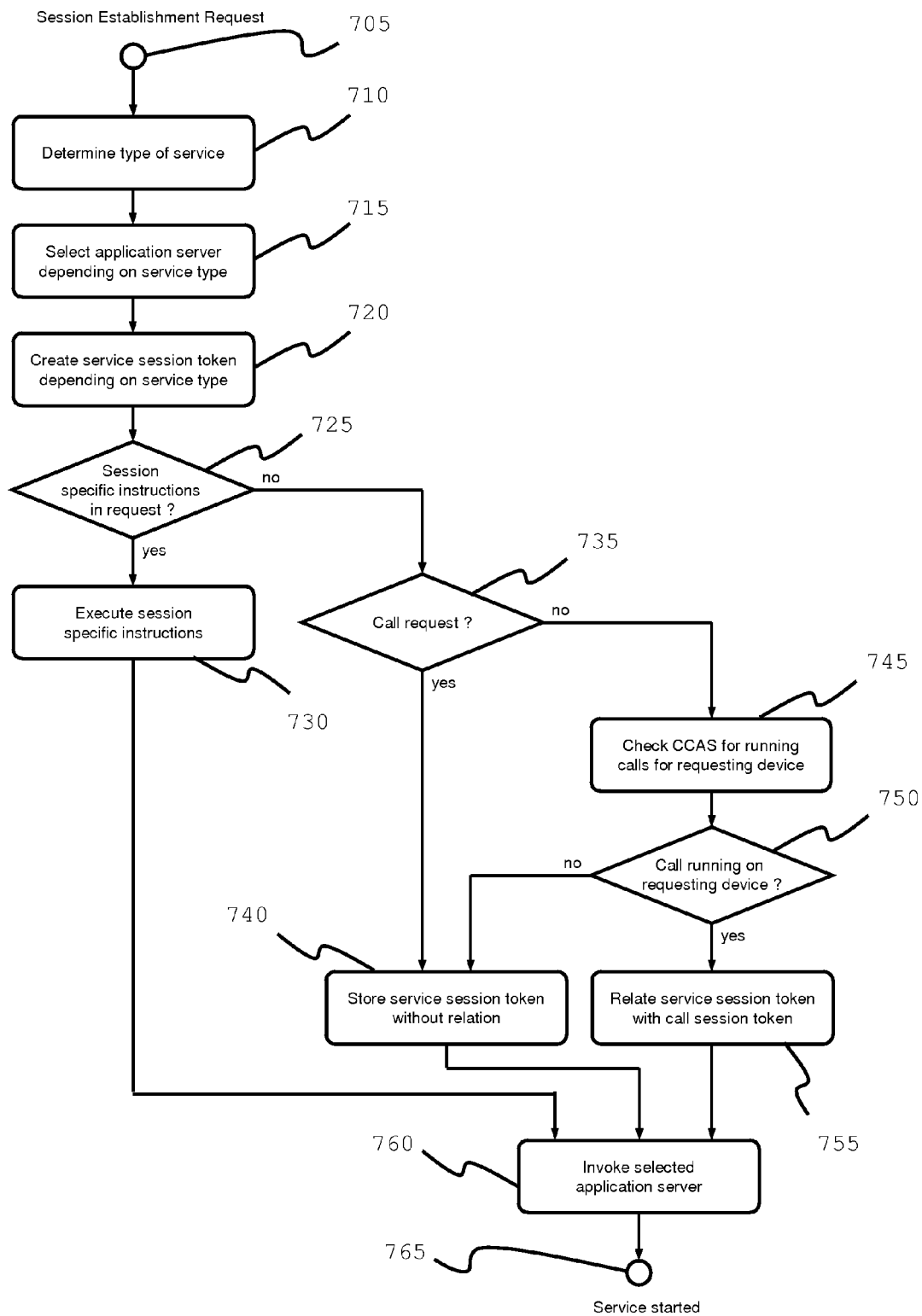
FIG. 4 a control flow for a session establishment request.
Figure 5:
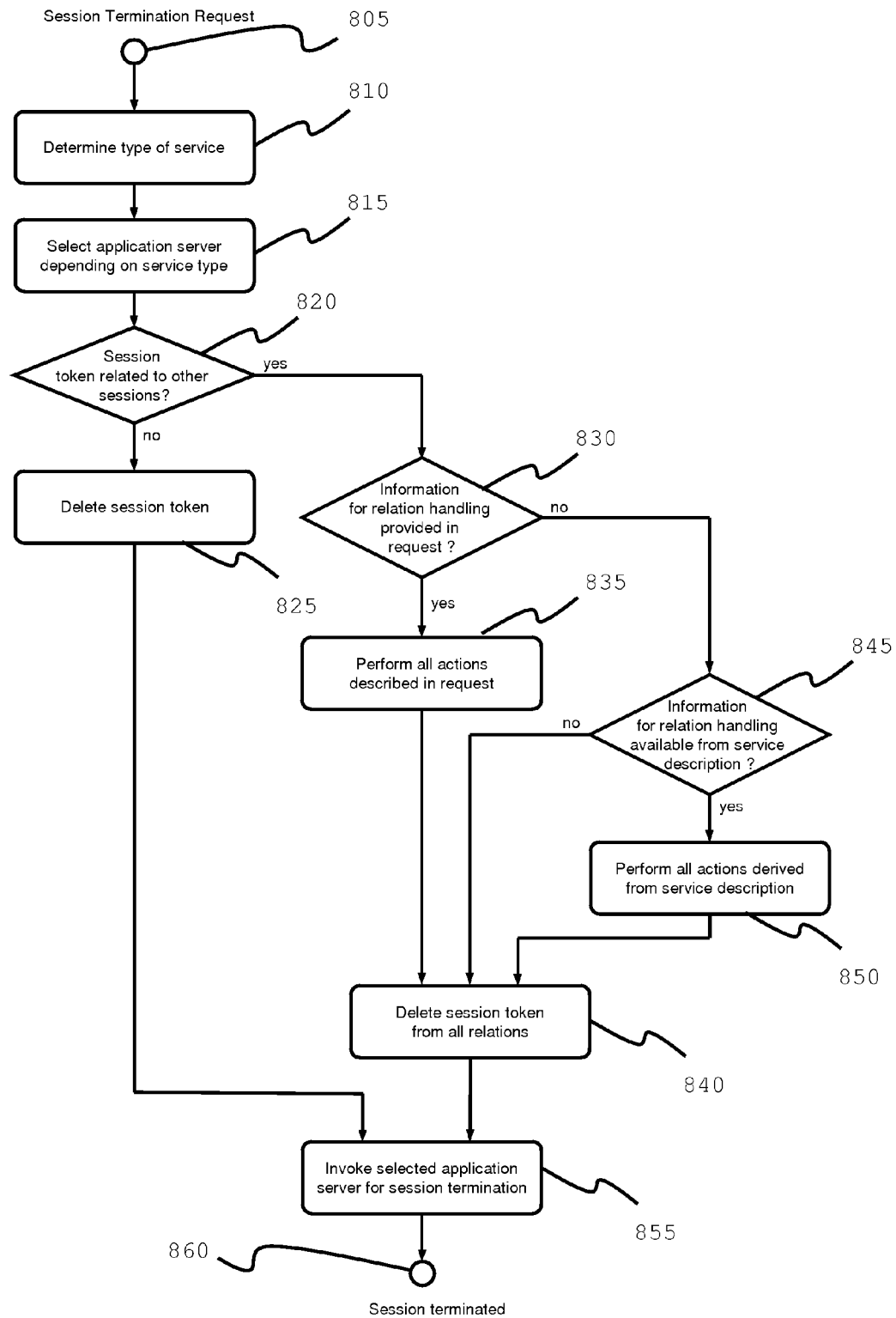
FIG. 5 a control flow for a session termination request.

The control flow within the ASCF 400 is depicted in FIG. 4 for a session establishment request and in FIG. 5 for a session termination request.

When a session establishment request 705 is received by the ASCF 400, first the type of the requested service is determined 710. Depending on the determined service type an according application server is selected 715 and an according service session token is created 720.

In this embodiment it is provided for the possibility to embed session specific instructions within the session establishment request, like for instance an instruction to create a relation record comprising a predefined session token also provided within the session establishment request or an instruction to perform a handover of a specific session and all related sessions to a different terminal device. If such session specific instructions are detected within the request 725, the session specific instructions are executed 730, the selected application server is invoked 760 and the service is started 765.

If no session specific instructions are provided within the session establishment request, it is determined whether the request is a request for a predefined first type of communication session, which after establishment shall be extendable with additional application service sessions. In the embodiment depicted in FIG. 3 this first type of communication session is a call session. Accordingly it is determined whether the request is a call request 735.

If it is a call request the service session token which was created in the action labeled 720 as a call session token is stored without relation information relating it to any other session token 740. If it is not a call request, but a request for a different application service, the CCAS 500 is checked for running calls for the requesting device 745. More generally, it is checked for the requesting terminal module whether a communication session of the above mentioned predefined first type already exists with the requesting terminal module as a participant.

If no call is running on the requesting device 750, the service session token created in the action labeled 720 as an application service session token is stored without relation 740. If however a call running on the requesting device is detected 750, the service session token created in the action labeled 720 as an application service session token is stored and related to the according call session token by means of storing a session relation record 755.

After performing the actions labeled 740 or 755, the selected application server is invoked 760 and the according service started 765. If the request is a call request, the selected application server is the CCAS 500.

FIG. 5 shows the control flow within the ASCF 400 for a session termination request, illustrating the great advantage semantic session relation which enables automatic termination of a session when related sessions are terminated.

When a session termination request 805 is received by the ASCF 400, first the type of the service to be terminated is determined 810. Depending on the determined service type the according application server is selected 815.

It is then determined whether the session token associated with the session to be terminated is related to other sessions 820.

If no relation information is stored the session token is deleted 825 and the selected application server is invoked for session termination 855, resulting in the session being terminated 860.

If the session token associated with the session to be terminated is related to other sessions 820, in this embodiment there are provided two alternatives for relation handling. The information for relation handling is either provided within the session termination request or it is available form the service description.

Accordingly, if the information is provided in the request 830, all actions described in the request are performed 835 before deleting the session token from all relations 840.

If no information for relation handling is provided in the request 830, it is checked whether information for relation handling is available from the service description 845. If so, all actions derived from the service description are performed 850 before deleting the session token from all relations 840.

If information on relation handling is not provided in the request 830 and also not available from the service description 845, the session token is deleted from all relations without performing any further actions 840.

After deleting the session token from all relations the selected application server is invoked for session termination 855 and the session is terminated 860.

Relation handling in particular comprises termination of related communication sessions. Accordingly information for relation handling provided within the termination request or in the service description comprises information on the service sessions to be terminated when related sessions are terminated depending on the respective types of sessions.

So for instance relation handling information can provide for all related service sessions to be terminated when a call session is terminated, but to preserve a call session when a specific related application service session is terminated.

REFERENCE NUMBERS

100 Multimedia IP network
210 Calling device
220 Called device
300 Call session control function (CSCF)
310 Call reception means (CRM)
320 Call route decision means (CRDM)
330 ASCF invocation means (ASCFIM)
340 Call forwarding means (CFM)
400 Application session control function (ASCF)
410 Request reception means (RRM)
420 Service type analysis means (STAM)
430 CCAS Inquiry Means (CCIM)
440 Application server selection means (ASSM)
450 Application session relation means (ASRM)
460 Application session relation storage (ASRS)
470 Application server invocation means (ASIM)
500 Call control application server (CCAS)
510 Call reception means (CRM)
520 Call session storage (CSS)
530 Call forwarding means (CFM)
600 Application server (AS)
705-765 Actions for processing a session establishment request
805-860 Actions for processing a session termination request
A-K Functional sequence for voice call establishment
a-p Functional sequence for establishment of an additional application session

What is claimed is:

1. A method for controlling communication between a number of first terminal modules connected to a multimedia IP network, comprising the steps of:
    establishing a first communications session between the first terminal modules, wherein the first communications session is a call session having a call session token;
    storing information related to the first communication session;
    receiving a request signal from one of the first terminal modules including a request to establish a second communication session, wherein the request signal is not a call request signal;
    selecting an application server based on a service type corresponding to the request signal;
    creating a service session token corresponding to the second communication session based on the service type;
    relating the service session token with the call session token;
    establishing the second communication session between at least a subset of the first terminal modules;
    storing relation information relating the first and the second communication sessions in an application session relation storage separate from the first terminal modules, wherein the relation information includes the call session token of the first communication session and the service session token of the second communication session; and
    automatically handing over the second communication session when the first communication session is handed over.

2. The method recited in claim 1, wherein the step of establishing the second communication session is performed while said first communication session already exists.

3. The method recited in claim 1, wherein the request signal is transmitted into the multimedia IP network by a second terminal module not part of the first communication session for initiating the steps of establishing the second communication session and of storing the relation information.

4. The method recited in claim 1, wherein the request signal is transmitted into the multimedia IP network by one of the first terminal modules for simultaneously initiating the steps of establishing the first and second communication sessions and of storing the relation information.

5. The method recited in claim 4, wherein the request signal comprises information on the type of the first and second communication sessions to be initiated.

6. The method recited in claim 1, wherein said call session is a conference call session enabling a simultaneous voice connection between at least three terminal modules.

7. The method recited in claim 1, further comprising the step of terminating at least one of the first and second communication sessions, wherein at least one other of the first and second communication sessions is automatically terminated depending on the stored relation information.

8. The method recited in claim 1, wherein the first terminal modules include phone devices adapted to transmit and receive voice information and to transmit a request signal into the multimedia IP network during an established voice connection.

9. A Multimedia IP network system adapted to control communication between terminal modules connected to a multimedia IP network, the system comprising:
    a call control application server comprising a call session storage device for storing information related to a first communication session, wherein the first communication session is a call session having a call session token, between at least two terminal modules connected to the multimedia IP network, an inquiry interface for receiving inquiries requesting information stored in said call session storage device, and an inquiry analysis device for processing a received inquiry and accessing said call session storage device for providing the requested information;
    a relation storage device separate from the at least two terminal modules; and
    an application session control module for:
        retrieving the information stored in said call session storage device via the inquiry interface,
        using the information stored in said call session storage device to determine if a request to establish a second communication session is received from one of the at least two terminal modules involved in the first communication session, wherein the request is not a call request,
        selecting an application server based on a service type corresponding to the request,
        creating a service session token corresponding to the second communication session based on the service type,
        relating the service session token with the call session token,
        storing relation information relating the first communication session and the second communication session in the relation storage device, and
        automatically handing over the second communication session when the first communication session is handed over;

wherein the relation information includes the call session token of the first communication session and the service session token of the second communication session.

10. A Multimedia IP network system adapted to control communication between a number of first terminal modules connected to a multimedia IP network, the system comprising:
- a first application server adapted to control a first communication session, wherein the first communication session is a call session having a call session token, between a plurality of terminal modules connected to the network system;
- at least one second application server adapted to control a second communication session between at least a subset of the plurality of terminal modules;
- a session storage device for storing information on the first and second communication sessions; and
- a control module for:
    - retrieving the information stored in the session storage device and determining,
    - based on the retrieved information, determining that a request to establish the second communication session is received from one of the plurality of terminals involved in the first communication session, wherein the request is not a call request;
    - selecting an application server based on a service type corresponding to the request,
    - creating a service session token corresponding to the second communication session based on the service type,
    - relating the service session token with the call session token,
    - storing relation information relating the first communication session and the second communication session in a relation storage device separate from the plurality of terminal modules, and
    - automatically handing over the second communication session when the first communication session is handed over;
- wherein the relation information includes the call session token of the first communication session and the service session token of the second communication session.

11. The network system recited in claim 10, wherein the first application server includes a call control application server comprising:
- a call session storage device for storing information related to a call session between at least two terminal modules connected to the multimedia IP network;
- an inquiry interface for receiving inquiries requesting information stored in said call session storage device; and
- an inquiry analysis device for processing a received inquiry and accessing said call session storage device for providing the requested information.

12. The network system recited in claim 10, wherein the control module is adapted to terminate at least one of the first and second communication sessions in response to termination of a related communication session.

* * * * *